United States Patent
Luo et al.

(10) Patent No.: US 11,499,755 B2
(45) Date of Patent: Nov. 15, 2022

(54) TRANSPORTATION REFRIGERATION SYSTEM

(71) Applicant: CARRIER CORPORATION, Palm Beach Gardens, FL (US)

(72) Inventors: Dong Luo, South Windsor, CT (US); Veronica Adetola, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/057,180

(22) PCT Filed: Nov. 11, 2019

(86) PCT No.: PCT/US2019/060729
§ 371 (c)(1),
(2) Date: Nov. 20, 2020

(87) PCT Pub. No.: WO2020/106478
PCT Pub. Date: May 28, 2020

(65) Prior Publication Data
US 2021/0268873 A1 Sep. 2, 2021

Related U.S. Application Data (60) Provisional application No. 62/769,958, filed on Nov. 20, 2018.

(51) Int. Cl.
*F25B 1/00* (2006.01)
*B60H 1/32* (2006.01)
(Continued)

(52) U.S. Cl.
CPC .............. *F25B 1/00* (2013.01); *B60H 1/005* (2013.01); *B60H 1/323* (2013.01); *B60H 1/3211* (2013.01);
(Continued)

(58) Field of Classification Search
CPC ........ F25B 1/00; F25B 41/22; B60H 1/32281; B60H 1/005; B60H 1/00135;
(Continued)

(56) References Cited

U.S. PATENT DOCUMENTS

| 5,231,847 A | 8/1993 | Cur et al. |
| 5,598,716 A | 2/1997 | Tanaka et al. |

(Continued)

FOREIGN PATENT DOCUMENTS

| CN | 102331134 A | 1/2012 |
| CN | 103912948 A | 7/2014 |

(Continued)

OTHER PUBLICATIONS

IPRP Application No. PCT/US2019/060729; Issued Jun. 3, 2021; pp. 7.

(Continued)

*Primary Examiner* — Marc E Norman
(74) *Attorney, Agent, or Firm* — Cantor Colburn LLP (57) ABSTRACT

A transportation refrigeration unit (TRU) system is provided and includes a damper assembly configured to direct air flows through first or second pathways and an evaporator disposed in the first pathway, a coil element surrounded by phase change material (PCM) and disposed in the second pathway and a routing assembly configured to direct refrigerant through the evaporator or the coil element. With the PCM pre-cooled, the damper and routing assemblies are controllable to respectively direct the air flows through the first pathway and the refrigerant through the evaporator when first conditions are met and to respectively direct the air flows through the second pathway when second conditions are met.

19 Claims, 4 Drawing Sheets

(51) Int. Cl.
    *B60H 1/00*         (2006.01)
    *F25B 41/22*       (2021.01)

(52) U.S. Cl.
    CPC ....... *B60H 1/3226* (2013.01); *B60H 1/32281* (2019.05); *F25B 41/22* (2021.01); *B60H 2001/3282* (2013.01); *B60H 2001/3283* (2013.01); *B60H 2001/3285* (2013.01)

(58) Field of Classification Search
    CPC ............ B60H 1/00482; B60H 1/00492; B60H 1/3211; B60H 1/3226; B60H 1/323; B60H 2001/3282; B60H 2001/3283; B60H 2001/3285
    See application file for complete search history.

(56) References Cited

U.S. PATENT DOCUMENTS

| | | | |
|---|---|---|---|
| 5,678,626 | A | 10/1997 | Gilles |
| 8,336,321 | B2 | 12/2012 | Cur et al. |
| 8,528,345 | B2 | 9/2013 | Parsonnet et al. |
| 9,464,837 | B2 * | 10/2016 | Wang .................... F28D 1/0341 |
| 9,677,789 | B2 | 6/2017 | Joppolo et al. |
| 10,063,186 | B2 | 8/2018 | Fairbanks et al. |
| 11,059,345 | B2 * | 7/2021 | Wijaya .................... F28F 1/126 |
| 2011/0067427 | A1 * | 3/2011 | Haller .................... F25B 47/02 62/434 |
| 2013/0098076 | A1 | 4/2013 | Hegedus et al. |
| 2015/0135743 | A1 | 5/2015 | Dobbs |
| 2016/0334154 | A1 | 11/2016 | Srichai et al. |
| 2017/0051954 | A1 | 2/2017 | Godbole et al. |
| 2017/0314839 | A1 | 11/2017 | Van Beek et al. |
| 2018/0087831 | A1 | 3/2018 | Chou et al. |
| 2018/0283726 | A1 * | 10/2018 | Wetzel .................. F24F 5/0046 |
| 2021/0323374 | A1 * | 10/2021 | Shin .................. B60H 1/00057 |

FOREIGN PATENT DOCUMENTS

| | | |
|---|---|---|
| EP | 1722182 A2 | 11/2006 |
| WO | 2016033142 A1 | 3/2016 |

OTHER PUBLICATIONS

Internatonal Search Report Application No. PCT/US2019/060729; dated Apr. 1, 2020; pp. 5.
Oro et al. "Improving thermal performance of freezers using phase change materials", International Journal of Refrigeration, vol. 35, Issue 4, pp. 984-991, Jun. 2012, Abstract Only.
Written Opinion Application No. PCT/US2019/060729; dated Apr. 1, 2020; pp. 7.

* cited by examiner

TRANSPORTATION REFRIGERATION SYSTEM

CROSS REFERENCE TO RELATED APPLICATIONS

This application claims the benefit of U.S. Application No. 62/769,958, filed on Nov. 20, 2018, which is incorporated herein by reference in its entirety.

BACKGROUND

The present disclosure relates to transportation refrigeration systems and, more particularly, to a transportation refrigeration system with thermal storage using phase change material (PCM).

A transportation refrigeration unit (TRU) is typically used in the transportation of perishable items. A TRU can be installed on a truck, for example, serves to maintain an environment within an interior of the trailer of the truck, in which perishable items are often stored, at a certain temperature range while the perishable items are being transported.

Operations of the TRU can be based on the vapor compression cycle in which a fluid, such as refrigerant, is used to cool air that is driven into the trailer. In a vapor compression cycle, the refrigerant enters a compressor as a superheated vapor and is compressed within the compressor to a higher pressure and a higher temperature. The hot, compressed superheated vapor is then condensed within a condenser by air flowing across the coil or tubes of the condenser whereby heat is rejected from the system and carried away by the air. Next, the condensed refrigerant is routed as a saturated or subcooled liquid through an expansion valve where it undergoes an abrupt reduction in pressure resulting in an adiabatic flash evaporation of a part of the refrigerant and lowers the temperature of the liquid and vapor refrigerant mixture to where it is colder than the temperature of the interior of the trailer. The cold mixture is then routed through the coil or tubes in an evaporator whereupon a fan circulates warm air in the enclosed space across the coil or tubes carrying the cold liquid and vapor refrigerant mixture. The warm air evaporates the liquid part and the circulating air is cooled and thus lowers the temperature of the interior of the trailer. The refrigerant is then routed back toward the compressor as the superheated vapor.

Often TRUs operate at varying conditions. At low load conditions, current TRU designs need to frequently turn on and off to handle small loads. This can lead to lower energy efficiency, large fluctuations of cabin air temperatures and shortened component lives. For a TRU system that is driven at least in part by battery power, such lower efficiencies result in reduced work time of the battery and shortened battery life.

BRIEF DESCRIPTION

According to an aspect of the disclosure, a transportation refrigeration unit (TRU) system is provided and includes a damper assembly configured to direct air flows through first or second pathways and an evaporator disposed in the first pathway, a coil element surrounded by phase change material (PCM) and disposed in the second pathway and a routing assembly configured to direct refrigerant through the evaporator or the coil element. With the PCM pre-cooled, the damper and routing assemblies are controllable to respectively direct the air flows through the first pathway and the refrigerant through the evaporator when first conditions are met and to respectively direct the air flows through the second pathway when second conditions are met.

In accordance with additional or alternative embodiments, the PCM is pre-cooled with grid or battery power, the first conditions are high-load conditions and the second conditions are low-load conditions.

In accordance with additional or alternative embodiments, the damper assembly includes first dampers at an outlet of the first pathway, second dampers at an outlet of the second pathway and third dampers between the first and second pathways and the routing assembly includes first and second piping fluidly connecting an expansion valve with the evaporator and the evaporator with a compressor, respectively, first and second valves disposed along the first and second piping, respectively, third and fourth piping fluidly connecting the first piping with the coil element and the coil element with the second piping, respectively, and third and fourth valves disposed along the third and fourth piping, respectively.

In accordance with additional or alternative embodiments, the first, second and third dampers are closed, the first and second valves are closed and the third and fourth valves are opened while the PCM is pre-cooled, the first dampers are opened, the second and third dampers are closed, the first and second valves are opened and the third and fourth valves are closed when the first conditions are met and the first dampers are closed, the second and third dampers are open and at least the third and fourth valves are closed when the second conditions are met.

In accordance with additional or alternative embodiments, the coil element includes the PCM and refrigerant tubes extending through the PCM and through which the refrigerant, which is directed through the coil element, flows.

In accordance with additional or alternative embodiments, the coil element includes a plurality of coil element slabs between which the air flows, which are directed through the coil element, proceed.

According to another aspect of the disclosure, a transportation refrigeration unit (TRU) system is provided and includes an air supply chamber that includes a damper assembly configured to direct air flows through first or second pathways, a vapor compression cycle that includes an evaporator disposed in the first pathway, a coil element surrounded by phase change material (PCM) and disposed in the second pathway and a routing assembly configured to direct refrigerant through the evaporator or the coil element and a controller. The controller is configured to pre-cool the PCM and to control the damper and routing assemblies to respectively direct the air flows through the first pathway and the refrigerant through the evaporator when first conditions are met and to respectively direct the air flows through the second pathway when second conditions are met.

In accordance with additional or alternative embodiments, the controller pre-cools the PCM with grid or battery power, the first conditions are high-load conditions and the second conditions are low-load conditions.

In accordance with additional or alternative embodiments, the damper assembly includes first dampers at an outlet of the first pathway, second dampers at an outlet of the second pathway and third dampers between the first and second pathways.

In accordance with additional or alternative embodiments, the controller closes the first, second and third dampers while the PCM is pre-cooled, opens the first dampers and closes the second and third dampers when the first conditions are met and closes the first dampers and opens the second and third dampers when the second conditions are met.

In accordance with additional or alternative embodiments, the routing assembly includes first and second piping fluidly connecting an expansion valve with the evaporator and the evaporator with a compressor, respectively, first and second valves disposed along the first and second piping, respectively, third and fourth piping fluidly connecting the first piping with the coil element and the coil element with the second piping, respectively, and third and fourth valves disposed along the third and fourth piping, respectively.

In accordance with additional or alternative embodiments, the controller closes the first and second valves and opens the third and fourth valves while the PCM is pre-cooled, opens the first and second valves and closes the third and fourth valves when the first conditions are met and closes at least the third and fourth valves when the second conditions are met.

In accordance with additional or alternative embodiments, the damper assembly includes first dampers at an outlet of the first pathway, second dampers at an outlet of the second pathway and third dampers between the first and second pathways and the routing assembly includes first and second piping fluidly connecting an expansion valve with the evaporator and the evaporator with a compressor, respectively, first and second valves disposed along the first and second piping, respectively, third and fourth piping fluidly connecting the first piping with the coil element and the coil element with the second piping, respectively, and third and fourth valves disposed along the third and fourth piping, respectively.

In accordance with additional or alternative embodiments, the controller closes the first, second and third dampers, closes the first and second valves and opens the third and fourth valves while the PCM is pre-cooled, opens the first dampers, closes the second and third dampers, opens the first and second valves and closes the third and fourth valves when the first conditions are met and closes the first dampers, opens the second and third dampers and closes at least the third and fourth valves when the second conditions are met.

In accordance with additional or alternative embodiments, the coil element includes the PCM and refrigerant tubes extending through the PCM and through which the refrigerant, which is directed through the coil element, flows.

In accordance with additional or alternative embodiments, the coil element includes a plurality of coil element slabs between which the air flows, which are directed through the coil element, proceed.

According to another aspect of the disclosure, a method of operating a transportation refrigeration unit (TRU) system is provided. The TRU includes a damper assembly configured to direct air flows through first or second pathways, an evaporator disposed in the first pathway, a coil element surrounded by phase change material (PCM) and disposed in the second pathway and a routing assembly configured to direct refrigerant through the evaporator or the coil element. The method includes pre-cooling the PCM, directing the air flows through the first pathway and the refrigerant through the evaporator when first conditions are met and directing the air flows through the second pathway when second conditions are met.

In accordance with additional or alternative embodiments, the pre-cooling of the PCM includes pre-cooling the PCM with grid or battery power, the first conditions are high-load conditions and the second conditions are low-load conditions.

In accordance with additional or alternative embodiments, the damper assembly includes first dampers at an outlet of the first pathway, second dampers at an outlet of the second pathway and third dampers between the first and second pathways and the routing assembly includes first and second piping fluidly connecting an expansion valve with the evaporator and the evaporator with a compressor, respectively, first and second valves disposed along the first and second piping, respectively, third and fourth piping fluidly connecting the first piping with the coil element and the coil element with the second piping, respectively, and third and fourth valves disposed along the third and fourth piping, respectively.

In accordance with additional or alternative embodiments, the pre-cooling of the PCM includes closing the first, second and third dampers, closing the first and second valves and opening the third and fourth valves, the directing when the first conditions are met includes opening the first dampers, closing the second and third dampers, opening the first and second valves and closing the third and fourth valves and the directing when the second conditions are met includes closing the first dampers, opening the second and third dampers and closing at least the third and fourth valves.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

As will be described below, a transport refrigeration unit (TRU) system is provided in which a vapor compression cycle is provided with a coil element that is surrounded by phase change material (PCM). The PCM can be pre-cooled from a liquid phase to a solid phase by grid or battery power at an initial time. In this precooling process, the refrigerant can be flown from a compressor to a condenser, from the condenser to an expansion valve, from the expansion valve to an coil element and from the coil element back to the compressor. Subsequently, during high-load conditions, refrigerant can be flown from the compressor to the condenser, from the condenser to the expansion valve, from the expansion valve to an evaporator and from the evaporator back to the compressor. Alternatively, during low-load conditions, the vapor compression cycle is turned off and cabin air is cooled by the precooled PCM in the coil element.

Figure 1:
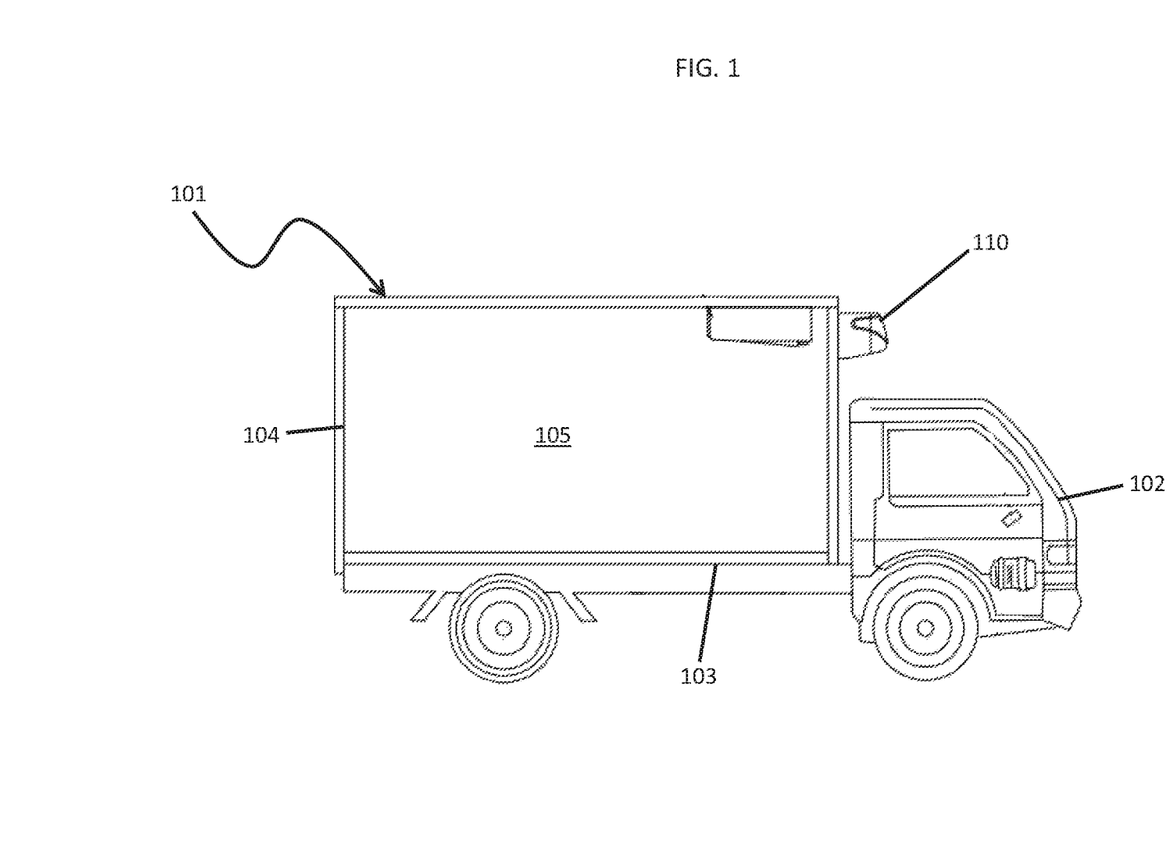
FIG. 1 is a vehicle including a transportation refrigeration unit (TRU) in accordance with embodiments.

With reference to FIG. 1, a vehicle 101 is provided and may be configured as a truck. The vehicle 101 includes a cabin 102 sized to accommodate an operator and an engine, a truck bed 103 and a trailer 104 supported atop the truck bed 103. The trailer 104 is formed to define an interior 105 in which perishable items can be stored for shipping. The vehicle 101 further includes a TRU system 110. The TRU system 110 is installed at a front side of the trailer 104 and is configured to control environmental conditions within the interior 105.

Figure 2:
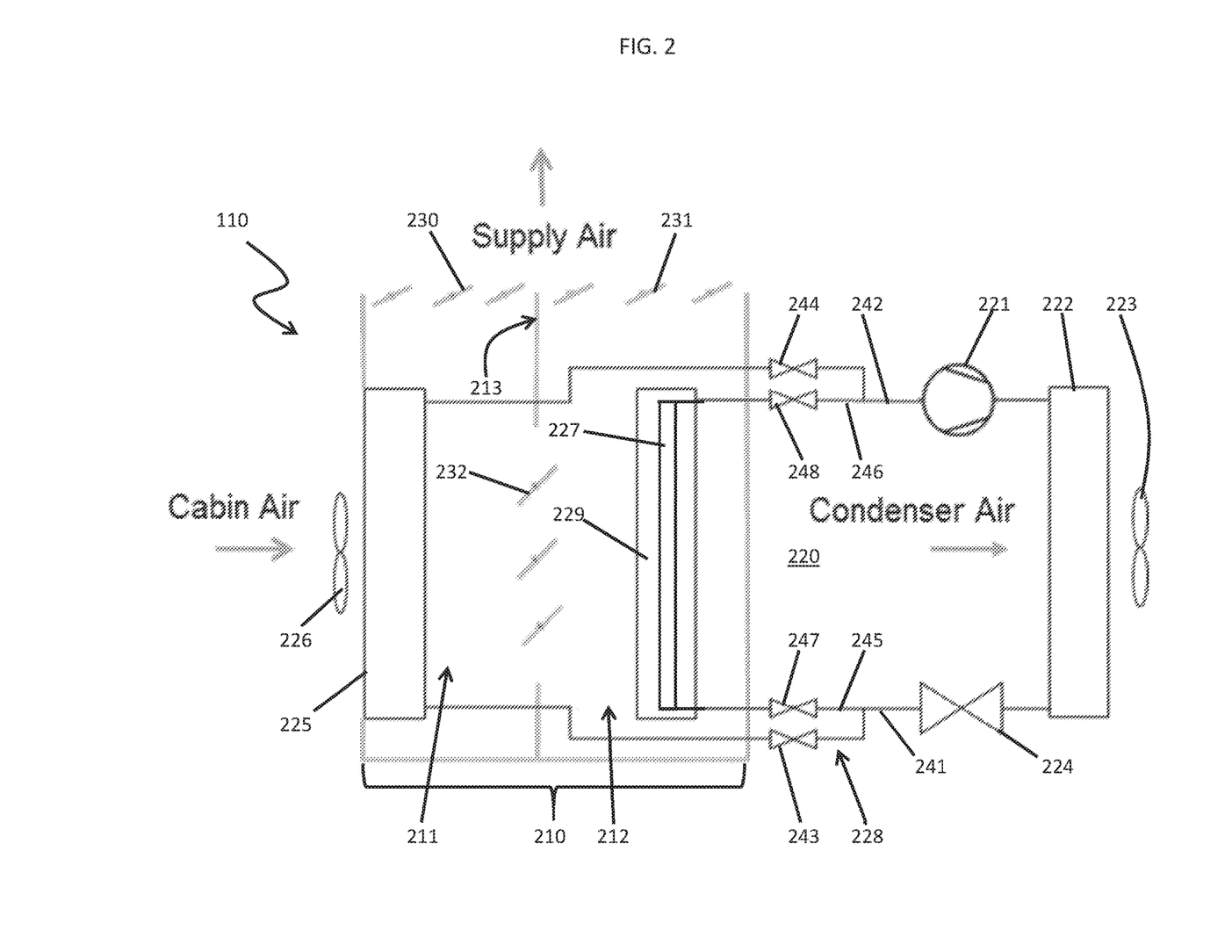
FIG. 2 is a schematic diagram illustrating components of the TRU of FIG. 1.

With continued reference to FIG. 1 and with additional reference to FIG. 2, the TRU system 110 includes an air supply chamber 210 and a vapor compression cycle unit 220. The air supply chamber 210 includes a first pathway 211, a second pathway 212 and a damper assembly 213. The first pathway 211 and the second pathway 212 are both disposed to output cooled air into the interior 105 of the trailer 104. The damper assembly 213 is configured to direct air flows through first pathway 211 or the second pathway 212. The vapor compression cycle unit 220 includes a compressor 221, a condenser 222, which includes a condenser fan 223 and which is disposed downstream from the compressor 221, and an expansion valve 224, which is disposed downstream from the condenser 222. The vapor compression cycle unit 220 further includes an evaporator 225, which includes an evaporator fan 226 and which is disposed in the first pathway 211 and which is fluidly interposed between the expansion valve 224 and the compressor 221, a coil element 227 and a routing assembly 228. The coil element 227 is surrounded by PCM 229, is disposed in the second pathway 212 and is fluidly interposed between the expansion valve 224 and the compressor 221. The routing assembly 228 is configured to direct refrigerant through the evaporator 225 or the coil element 227.

Figure 3:
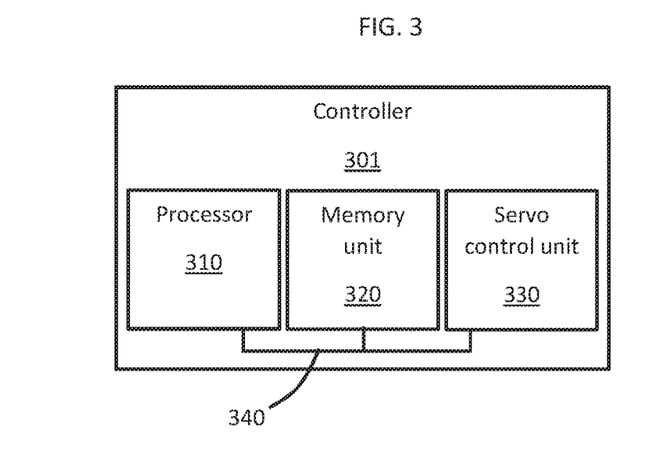
FIG. 3 is a schematic diagram of a controller of the TRU of FIG. 2 in accordance with embodiments.

With continued reference to FIGS. 1 and 2 and with additional reference to FIG. 3, the TRU system 110 also includes a controller 301. The controller 301 can include a processor 310, a memory unit 320, a servo control unit 330, which is operably coupled to the various components of the vapor compression cycle unit 220, the damper assembly 213 and the routing assembly 228, and an input/output (I/O) unit 340 by which the processor 310, the memory unit 320 and the servo control unit 330 are communicative with each other. The memory unit 320 has executable instructions stored thereon, which are readable and executable by the processor 310. When the executable instructions are read and executed by the processor 310, the executable instructions cause the processor 310 to instruct the servo control unit 330 to pre-cool the PCM 229 and to control both the damper assembly 213 and the routing assembly 228 to respectively direct the air flows through the first pathway 211 and the refrigerant through the evaporator 225 when first conditions are met (as will be discussed below) and to respectively direct the air flows through the second pathway 212 when second conditions are met (as will be discussed below).

The pre-cooling of the PCM 229 causes the PCM to change from a liquid state to a solid state and can be achieved prior to a normal operation of the TRU system 110 using power drawn from an electric grid (by, e.g., plugging the PCM 229 into a wall outlet or a charging station while the vehicle 101 is parked) and/or from a battery (e.g., the battery on board the vehicle 101). Also, the first conditions are high-load conditions and can be characterized as cases in which cooling demands in the interior 105 of the trailer 104 are relatively high, and the second conditions are low-load conditions and can be characterized as cases in which cooling demands in the interior 105 of the trailer 104 are relatively low.

With reference back to FIG. 2, features of the damper assembly 213 and the routing assembly 228 will now be described. The damper assembly 213 includes first dampers 230 at an outlet of the first pathway 211 to open or close the first pathway 211, second dampers 231 at an outlet of the second pathway 212 to open or close the second pathway 212 and third dampers 232 between the first and second pathways 211 and 212 direct air flow through the first pathway 211 or the second pathway 212. The routing assembly 228 includes first piping 241 fluidly connecting the expansion valve 224 with the evaporator 225 and second piping 242 fluidly connecting the evaporator 225 with the compressor 221. The routing assembly 228 further includes a first valve 243 disposed along the first piping 241, a second valve 244 disposed along the second piping 242, third piping 245 fluidly connecting the first piping 241 with the coil element 227, fourth piping 246 fluidly connecting the coil element 227 with the second piping 242, a third valve 247 disposed along the third piping 245 and a fourth valve 248 disposed along the fourth piping 246.

The processor 310 of the controller 301 can instruct the servo control unit 330 to close the first, second and third dampers 230, 231 and 232, to close the first and second valves 243 and 244, to open the third and fourth valves 247 and 248, to activate the compressor 221 and the condenser fan 223 and to deactivate the evaporator fan 226 while the PCM 229 is pre-cooled.

When the first conditions are met and the TRU 110 is operated under high-load conditions, the processor 310 of the controller 301 can instruct the servo control unit 330 to open the first dampers 230, to close the second and third dampers 231 and 232, to open the first and second valves 243 and 244, to close the third and fourth valves 247 and 248 and to activate the compressor 221, the condenser fan 223 and the evaporator fan 226. This will engage the evaporator 225.

Here, the refrigerant enters the compressor 221 from the evaporator 225 along the second piping 242 via the open second valve 244 (the closed fourth valve 248 blocks the fourth piping 246) as a superheated vapor and is compressed within the compressor 221 to a higher pressure and a higher temperature. The hot, compressed superheated vapor is then condensed within the condenser 222 by air being flown across the coil or tubes of the condenser 222 by the condenser fan 223. Heat is rejected from the system and carried away by this air. Next, the condensed refrigerant is routed as a saturated or subcooled liquid through the expansion valve 224 where it undergoes an abrupt reduction in pressure resulting in an adiabatic flash evaporation of a part of the refrigerant and lowers the temperature of the liquid and vapor refrigerant mixture to where it is colder than the temperature of the interior 105 of the trailer 104. The cold mixture is then routed to the evaporator 225 along the first piping 241 via the open first valve 243 (the closed third valve 247 blocks the third piping 245) and through the coil or tubes in the evaporator 225 whereupon the evaporator fan 226 circulates warm air drawn from the interior 105 across the coil or tubes of the evaporator 225 within the first pathway 211 due to the first dampers 230 being open and the second and third dampers 231 and 232 being closed. The warm air evaporates the liquid part of the refrigerant mixture and the circulating air is cooled before returning to the interior 105 and thus lowering the temperature of the interior 105. The refrigerant is then routed back toward the compressor 221 as the superheated vapor.

When the second conditions are met and the TRU 110 is operated under low-load conditions, the processor 310 of the controller 301 can instruct the servo control unit 330 to close the first dampers 230, to open the second and third dampers 231 and 232, to close at least the third and fourth valves 247 and 248, to deactivate the compressor 221 and the condenser fan 223 and to activate the evaporator fan 226. This will engage the coil element 227 with air flows generated by the evaporator fan 226 being directed over and around the PCM 229. As long as the PCM 229 remains in the solid state and is cooler than the interior 105 of the trailer 104, the PCM 229 will be able to provide cooling for the interior 105.

Figure 4:
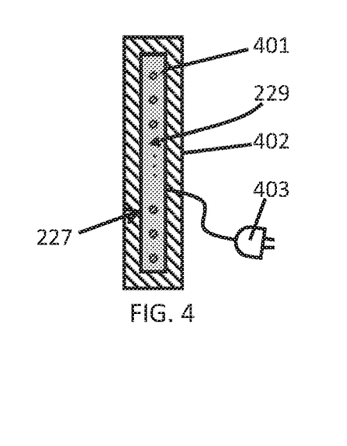
FIG. 4 is a cross-sectional view of a coil element of the TRU of FIG. 2 in accordance with embodiments.

With reference to FIG. 4 and in accordance with embodiments, the coil element 227 includes the PCM 229 and refrigerant tubes 401 through which refrigerant directed through the coil element 227 can flow. The refrigerant tubes 401 extend through the PCM 229.

Figure 5:
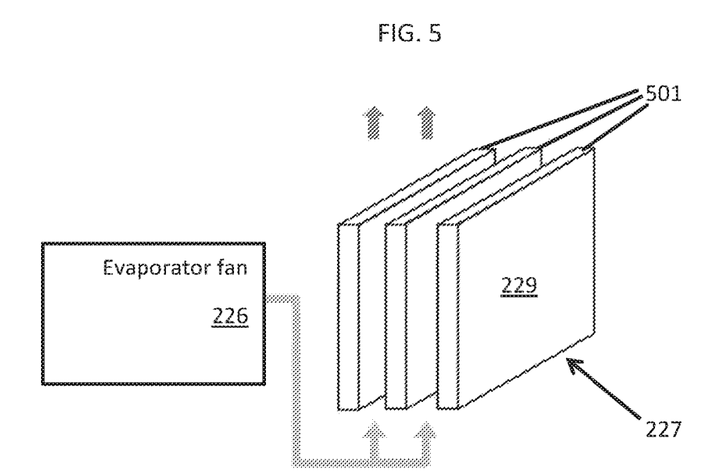
FIG. 5 is a perspective view of a coil element of the TRU of FIG. 2 in accordance with embodiments.

With reference to FIG. 5 and in accordance with embodiments, the coil element 227 can be provided as a plurality of coil element slabs 501 where each coil element slab 501 includes the PCM 229 and refrigerant tubes through which refrigerant directed through the coil element 227 can flow. As shown in FIG. 5, air flows generated by the evaporator fan 226 can be directed between the coil element slabs 501 prior to entering the interior 105 of the trailer 104. As such, separations between the coil element slabs 501 and the surface area of the coil element slabs 501 which is exposed to the air flows need to be weighed against each other to achieve sustained cooling capability without sacrificing mass flow rates.

In accordance with further embodiments, the coil element 227 can be provided with an exterior encasement 402 (see FIG. 4) to encase the PCM 229 in the liquid and the solid phases thereof. The exterior encasement 402 can be formed of highly thermally conductive material which is also at least one of compliant and deformable. As such, heat transfer across the exterior encasement 402 is possible while the PCM 229 is permitted to vary in shape and size as it transitions between the liquid and solid phases. In addition, the compliance and deformability of the exterior encasement 402 permits the coil element 227 to be designed in various overall shapes and sized as described above with reference to FIGS. 4 and 5.

In accordance with still further embodiments, the coil element 227 can be removably installed in the TRU system 110 and can be charged in an installed or non-installed condition. In either case, the coil element 227 includes a charging element 403 (see FIG. 4) that can be coupled to a power source, such as an electrical grid or a battery, so that the coil element 227 can be charged.

Figure 6:
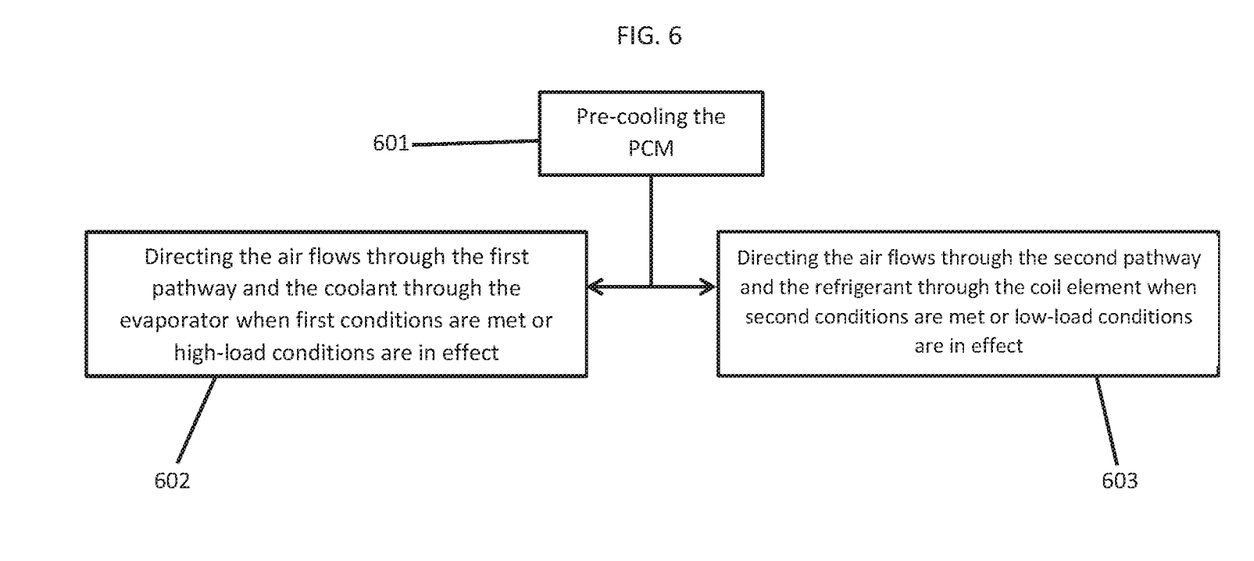
FIG. 6 is a flow diagram illustrating a method of operating the TRU of FIGS. 2, 4 and 5 and the controller of FIG. 3 in accordance with embodiments.

With reference to FIG. 6, a method of operating the TRU 110 described herein is provided. As shown in FIG. 6, the method includes pre-cooling the PCM (601) with electric grid or battery power, directing the air flows through the first pathway and the refrigerant through the evaporator when first conditions are met or high-load conditions are in effect (602) and directing the air flows through the second pathway and the refrigerant through the coil element when second conditions are met or low-load conditions are in effect (603).

Benefits of the features described herein are the reduction of on/off refrigeration system cycles at low loads and/or low ambient temperatures. This will help increase energy efficiency by reducing cycling and operation of compressor and condenser fans, decrease fluctuations in cabin air temperatures and improve component life spans. For systems driven by battery power, continuous operation times and battery life will be increased.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transportation refrigeration unit (TRU) system, comprising:
    a damper assembly configured to direct air flows through first or second pathways; and
    an evaporator disposed in the first pathway, a coil element surrounded by phase change material (PCM) and disposed in the second pathway and a routing assembly configured to direct refrigerant through the evaporator or the coil element,
    wherein, with the PCM pre-cooled, the damper and routing assemblies are controllable to respectively direct:
        the air flows through the first pathway and the refrigerant through the evaporator when first conditions are met, and
        the air flows through the second pathway when second conditions are met, and
    wherein the damper assembly comprises first dampers at an outlet of the first pathway, second dampers at an outlet of the second pathway and third dampers between the first and second pathways.

2. The TRU system according to claim 1, wherein: the PCM is pre-cooled with grid or battery power.

3. The TRU system according to claim 1, wherein: the routing assembly comprises first and second piping fluidly connecting an expansion valve with the evaporator and the evaporator with a compressor, respectively, first and second valves disposed along the first and second piping, respectively, third and fourth piping fluidly connecting the first piping with the coil element and the coil element with the second piping, respectively, and third and fourth valves disposed along the third and fourth piping, respectively.

4. The TRU system according to claim 3, wherein:
the first, second and third dampers are closed, the first and second valves are closed and the third and fourth valves are opened while the PCM is pre-cooled,
the first dampers are opened, the second and third dampers are closed, the first and second valves are opened and the third and fourth valves are closed when the first conditions are met, and
the first dampers are closed, the second and third dampers are open and at least the third and fourth valves are closed when the second conditions are met.

5. The TRU system according to claim 1, wherein the coil element comprises:
the PCM; and
refrigerant tubes extending through the PCM and through which the refrigerant, which is directed through the coil element, flows.

6. The TRU system according to claim 1, wherein the coil element comprises a plurality of coil element slabs between which the air flows, which are directed through the coil element, proceed.

7. A transportation refrigeration unit (TRU) system, comprising:
an air supply chamber comprising a damper assembly configured to direct air flows through first or second pathways;
a vapor compression cycle comprising an evaporator disposed in the first pathway, a coil element surrounded by phase change material (PCM) and disposed in the second pathway and a routing assembly configured to direct refrigerant through the evaporator or the coil element; and
a controller configured to pre-cool the PCM and to control the damper and routing assemblies to respectively direct:
the air flows through the first pathway and the refrigerant through the evaporator when first conditions are met, and
the air flows through the second pathway when second conditions are met,
wherein the damper assembly comprises:
first dampers at an outlet of the first pathway;
second dampers at an outlet of the second pathway; and
third dampers between the first and second pathways.

8. The TRU system according to claim 7, wherein:
the controller pre-cools the PCM with grid or battery power.

9. The TRU system according to claim 7, wherein the controller closes the first, second and third dampers while the PCM is pre-cooled, opens the first dampers and closes the second and third dampers when the first conditions are met and closes the first dampers and opens the second and third dampers when the second conditions are met.

10. The TRU system according to claim 7, wherein the routing assembly comprises:
first and second piping fluidly connecting an expansion valve with the evaporator and the evaporator with a compressor, respectively;
first and second valves disposed along the first and second piping, respectively;
third and fourth piping fluidly connecting the first piping with the coil element and the coil element with the second piping, respectively; and
third and fourth valves disposed along the third and fourth piping, respectively.

11. The TRU system according to claim 10, wherein the controller closes the first and second valves and opens the third and fourth valves while the PCM is pre-cooled, opens the first and second valves and closes the third and fourth valves when the first conditions are met and closes at least the third and fourth valves when the second conditions are met.

12. The TRU system according to claim 7, wherein:
the damper assembly comprises first dampers at an outlet of the first pathway, second dampers at an outlet of the second pathway and third dampers between the first and second pathways, and
the routing assembly comprises first and second piping fluidly connecting an expansion valve with the evaporator and the evaporator with a compressor, respectively, first and second valves disposed along the first and second piping, respectively, third and fourth piping fluidly connecting the first piping with the coil element and the coil element with the second piping, respectively, and third and fourth valves disposed along the third and fourth piping, respectively.

13. The TRU system according to claim 12, wherein:
the controller closes the first, second and third dampers, closes the first and second valves and opens the third and fourth valves while the PCM is pre-cooled,
opens the first dampers, closes the second and third dampers, opens the first and second valves and closes the third and fourth valves when the first conditions are met, and
closes the first dampers, opens the second and third dampers and closes at least the third and fourth valves when the second conditions are met.

14. The TRU system according to claim 7, wherein the coil element comprises:
the PCM; and
refrigerant tubes extending through the PCM and through which the refrigerant, which is directed through the coil element, flows.

15. The TRU system according to claim 7, wherein the coil element comprises a plurality of coil element slabs between which the air flows, which are directed through the coil element, proceed.

16. A method of operating a transportation refrigeration unit (TRU) system, comprising a damper assembly configured to direct air flows through first or second pathways, an evaporator disposed in the first pathway, a coil element surrounded by phase change material (PCM) and disposed in the second pathway and a routing assembly configured to direct refrigerant through the evaporator or the coil element, the method comprising:
pre-cooling the PCM;
directing the air flows through the first pathway and the refrigerant through the evaporator when first conditions are met; and
directing the air flows through the second pathway when second conditions are met,
wherein the damper assembly comprises first dampers at an outlet of the first pathway, second dampers at an outlet of the second pathway and third dampers between the first and second pathways.

17. The method according to claim 16, wherein:
the pre-cooling of the PCM comprises pre-cooling the PCM with grid or battery power.

18. The method according to claim 16, wherein:
the routing assembly comprises first and second piping fluidly connecting an expansion valve with the evaporator and the evaporator with a compressor, respectively, first and second valves disposed along the first and second piping, respectively, third and fourth piping fluidly connecting the first piping with the coil element and the coil element with the second piping, respectively, and third and fourth valves disposed along the third and fourth piping, respectively.

19. The method according to claim 18, wherein:

the pre-cooling of the PCM comprises closing the first, second and third dampers, closing the first and second valves and opening the third and fourth valves, the directing when the first conditions are met comprises opening the first dampers, closing the second and third dampers, opening the first and second valves and closing the third and fourth valves, and the directing when the second conditions are met comprises closing the first dampers, opening the second and third dampers and closing at least the third and fourth valves.

* * * * *